(12) United States Patent
Hoerold et al.

(10) Patent No.: US 7,255,814 B2
(45) Date of Patent: Aug. 14, 2007

(54) FLAME RETARDANT AND STABILIZER COMBINED FOR THERMOPLASTICS POLYMERS

(75) Inventors: Sebastian Hoerold, Diedorf (DE); Ottmar Schacker, Gersthofen (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 11 days.

(21) Appl. No.: 10/791,624

(22) Filed: Mar. 2, 2004

(65) Prior Publication Data

US 2004/0227130 A1    Nov. 18, 2004

(30) Foreign Application Priority Data

Mar. 3, 2003   (DE) ................ 103 09 385

(51) Int. Cl.
C09K 21/04 (2006.01)
C09K 21/10 (2006.01)
C09K 21/12 (2006.01)

(52) U.S. Cl. .............. 252/609; 524/126; 524/428

(58) Field of Classification Search .......... 252/609; 524/126, 428
See application file for complete search history.

(56) References Cited

U.S. PATENT DOCUMENTS

| | | | |
|---|---|---|---|
| 3,900,444 A | | 8/1975 | Racky et al. |
| 4,036,811 A | | 7/1977 | Noetzel et al. |
| 5,684,071 A | * | 11/1997 | Mogami et al. ............ 524/100 |
| 5,780,534 A | | 7/1998 | Kleiner et al. |
| 5,879,920 A | | 3/1999 | Dale et al. |
| 5,958,287 A | | 9/1999 | Pullen |
| 6,013,707 A | | 1/2000 | Kleiner et al. |
| 6,084,012 A | | 7/2000 | Gareiss et al. |
| 6,124,366 A | | 9/2000 | Pullen et al. |
| 6,207,736 B1 | | 3/2001 | Nass et al. |
| 6,255,371 B1 | * | 7/2001 | Schlosser et al. ............ 524/100 |
| 6,365,071 B1 | | 4/2002 | Jenewein et al. |
| 6,509,401 B1 | | 1/2003 | Jenewein et al. |
| 6,547,992 B1 | * | 4/2003 | Schlosser et al. ............ 252/609 |
| 6,649,704 B2 | * | 11/2003 | Brewer et al. ............... 525/431 |
| 6,716,899 B1 | | 4/2004 | Klatt et al. |
| 6,964,746 B2 | * | 11/2005 | Schlosser et al. ............ 252/609 |
| 2001/0007888 A1 | * | 7/2001 | Asano ........................ 524/115 |
| 2003/0162868 A1 | * | 8/2003 | Stretanski et al. ............ 524/100 |
| 2004/0176510 A1 | | 9/2004 | Geprags |
| 2005/0032958 A1 | | 2/2005 | Bauer et al. |
| 2005/0049339 A1 | | 3/2005 | Knop et al. |
| 2005/0101706 A1 | | 5/2005 | Bauer et al. |
| 2005/0101707 A1 | | 5/2005 | Bauer et al. |
| 2005/0101708 A1 | * | 5/2005 | Knop et al. .................. 524/115 |

FOREIGN PATENT DOCUMENTS

| | | |
|---|---|---|
| DE | 2252258 | 5/1974 |
| DE | 2447727 | 4/1976 |
| DE | 19614424 | 10/1997 |
| DE | 19734437 | 2/1999 |
| DE | 19737727 | 7/1999 |
| DE | 199290276 | 11/2000 |
| DE | 19933901 | 2/2001 |
| EP | 0699708 | 3/1996 |
| EP | 0903372 | 3/1999 |
| EP | 1024167 | 8/2000 |
| WO | WO97/39053 | 10/1997 |
| WO | WO 00/66658 | 11/2000 |

OTHER PUBLICATIONS

EPO Search Report for corresponding application EP 04 00 3957, mailed Dec. 21, 2004.
Zweifel, "Plastics Additives Handbook", 5th ed. Carl Hanser Verlag, Munich, pp. 80-84 (2000).
USPTO Office Action for U.S. Appl. No. 10/656,313, U.S. Pub. No. 2005-0032958, mailed Jan. 25, 2005.
U.S. Appl. No. 11/015,188, by Schlosser et al., filed Dec. 17, 2004.
U.S. Appl. No. 11/143,059, filed Jun. 2, 2003, by Bauer et al.

* cited by examiner

Primary Examiner—Lorna M. Douyon
Assistant Examiner—Amina Khan
(74) Attorney, Agent, or Firm—Anthony A. Bisulca

(57) ABSTRACT

The invention relates to a novel flame retardant and stabilizer combined, for thermoplastics, which comprises as component A, phosphinic or diphosphinic salts and/or polymers thereof, as component B, a nitrogen containing synergist or a phosphorous/nitrogen flame retardant, as component C, a basic or amphoteric oxide, hydroxide, carbonate, silicate, borate, stannate, mixed oxide/hydroxide, oxide/hydroxide/carbonate, hydroxide/silicate, hydroxide/borate or mixtures thereof, optionally as component D, a phosphonite or a phosphonite/phosphate mixture, optionally as component E, an ester or salt of montan wax 4, and as component F, an aromatic di- or tricarboxylic ester or aromatic di- or tricarboxamide, the entirety of the components always being 100%.

30 Claims, No Drawings

FLAME RETARDANT AND STABILIZER COMBINED FOR THERMOPLASTICS POLYMERS

The invention relates to a flame retardant and stabilizer combined for thermoplastic polymers, and to polymeric molding compositions which comprise these flame retardants and stabilizers combined.

With a few exceptions, the processing of thermoplastics takes place in the melt. The attendant changes in structure and conditions bring about alterations of chemical structure in almost all plastics. The consequence can be crosslinking, oxidation, molecular-weight changes, and also resultant changes in physical and technical properties. In order to reduce the adverse effect on the polymers during processing, various additives are added, depending on the plastic. Stabilizers are generally added, and these suppress, or at least retard, the alteration processes, such as reactions involving crosslinking or involving degradation. Lubricants are also admixed with most plastics, the main function of these being to improve the flow behavior of the melt.

A wide variety of different additives is generally used simultaneously, each of these assuming one function. For example, antioxidants and stabilizers are used in order that the plastic withstand processing with no chemical degradation, and then be stable over a long period with respect to external effects, such as heat, UV light, weathering and oxygen (air). Lubricants not only improve flow behavior but also inhibit excessive adhesion of the plastics melt to hot machinery parts, and act as dispersing agents for pigments, fillers, and reinforcing materials.

The use of flame retardants can have an effect on the stability of the plastic during processing in the melt. Large amounts of flame retardants often have to be added in order to give the plastic adequate flame retardancy complying with international standards. The chemical reactivity of flame retardants, which is required for flame-retardant action at high temperatures, can result in impairment of the processing stability of plastics. By way of example, the result can be increased polymer degradation, crosslinking reactions, evolution of gases, or discoloration. When plastics are processed without flame retardant, some of these effects do not occur at all, or occur only to a reduced extent.

When no flame retardants are added, polyamides are generally stabilized by small amounts of copper halides, or else by aromatic amines and sterically hindered phenols, the main aim being to achieve long-term stability at high long-term service temperatures: "Plastics Additives Handbook", 5$^{th}$ Edition, (H. Zweifel (ed.), Carl Hanser Verlag, Munich, 2000, pages 80 to 84).

Particularly for thermoplastic polymers, the salts of phosphinic acids (phosphinates) have proven to be effective flame-retardant additives (DE-A-2 252 258 uad DE-A-2 447 727). Calcium phosphinates and aluminum phosphinates have been described as having particularly effective action in polyesters, and impair the properties of the polymer molding composition materials to a lesser degree than, by way of example, the alkali metal salts (EP-A-0 699 708).

Synergistic combinations of phosphinates with certain nitrogen-containing compounds have also been found, and these have more effective action as flame retardant than the phosphinates alone in very many polymers (PCT/EP97/01664, and also DE-A-197 34 437 and DE-A-197 37 727).

Carbodiimides, isocyanates, and isocyanurates have proven effective for stabilizing polymer molding compositions with phosphorus-containing flame retardants (DE-A-199 20 276).

In particular when phosphorus-containing flame retardants are used in polyamides, the action of the stabilizers described hitherto has proven to be insufficient, especially for suppressing effects arising during processing, such as discoloration and molecular-weight degradation.

DE-A-196 14 424 describes phospinates in combination with nitrogen synergists in polyesters and in polyamides. DE-A-199 33 901 describes phosphinates in combination with melamine polyphosphate as flame retardants for polyesters and polyamides. However, when these newly developed, highly active flame retardants are used the result can be partial polymer degradation, and also discoloration of the polymer, in particular at processing temperatures above 300° C.

It was therefore an object of the present invention to provide flame retardant combinations for thermoplastics, where these provide not only flame retardancy but also a stabilizing action with respect to the plastic. This object is achieved by adding basic or amphoteric oxides, hydroxides, carbonates, silicates, borates, stannates, mixed oxide/hydroxides, oxide/hydroxide/carbonates, hydroxide/silicates or hydroxide/borates, or a mixture of these substances (component C) in combination with a mixture composed of a phosphonite or a phosphonite/phosphite mixture (component D) and an ester or salt of montan wax acid (component E), or a combination composed of components D or E with an aromatic di- or tricarboxylic ester or aromatic di- or tricarboxamide (component F), or with a combination of D, E, and F, when phosphinates (component A) or a mixture of these are used with nitrogen-containing synergists (component B) as flame retardants.

The invention therefore provides a flame retardant and stabilizer combined, for thermoplastic polymers, which comprises, as component A, from 25 to 99.9% by weight of a phosphinic salt of the formula (I) and/or a diphosphinic salt of the formula (II) and/or polymers of these,

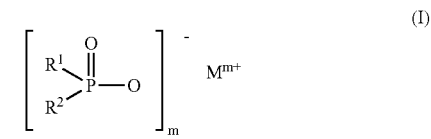

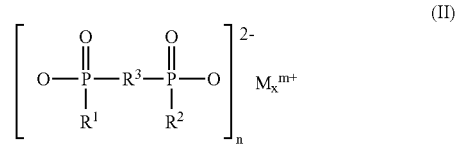

where

R$^1$, R$^2$ are identical or different and are C$_1$-C$_6$-alkyl, linear or branched, and/or aryl;

R$^3$ is C$_1$-C$_{10}$-alkylene, linear or branched, C$_6$-C$_{10}$ arylene, -alkylarylene or -arylalkylene;

M is Mg, Ca, Al, Sb, Sn, Ge, Ti, Zn, Fe, Zr, Ce, Bi, Sr, Mn, Li, Na, K, and/or a protonated nitrogen base;

m is 1 to 4;

n is 1 to 4;

x is 1 to 4, and comprises, as component B, from 10 to 75% by weight of a nitrogen-containing synergist or of a phosphorus/nitrogen flame retardant, and comprises, as component C, from 0.1 to 50% by weight of a basic or amphoteric oxide, hydroxide, carbonate, silicate, borate, stannate, mixed oxide/hydroxide, oxide/hydroxide/carbonate, hydroxide/silicate, or hydroxide/borate, or a mixture of these substances, and comprises, as component D, from 0 to 5% by weight of a phosphonite of the structure

where
R is a mono- or polyvalent aliphatic, aromatic, or heteroaromatic organic radical, and
$R_1$ is a compound of the structure (II)

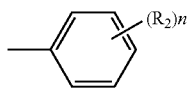

or the two radicals $R_1$ form a bridging group of the structure (III)

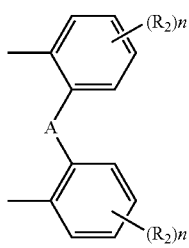

where
A is a direct bond, O, S, $C_{1-18}$-alkylene (linear or branched), $C_{1-18}$-alkylidene (linear or branched),
where
$R_2$, independently of one another, are $C_{1-12}$-alkyl (linear or branched), $C_{1-12}$-alkoxy, $C_{5-12}$-cycloalkyl, and
n is from 0 to 5, and
m is from 1 to 4, and comprises, as component E, from 0 to 5% by weight of an ester or salt of montan wax acid, and comprises, as component F, from 0.1 to 5% by weight of an N,N'-bispiperidinyl-1,3-benzenedicarboxamide and/or N,N'-bis(2,2,6,6-tetramethyl-4-piperidinyl)-1,3-benzenedicarboxamide, the entirety of the components always being 100% by weight.

Surprisingly, it has been found that inventive combinations of phosphinates and, where appropriate, nitrogen synergists, such as melamine polyphosphate, exhibit markedly improved stability on incorporation into polymers if certain oxides, hydroxides, carbonates, silicates, borates, stannates, mixed oxide/hydroxides, oxide/hydroxide/carbonates, hydroxide/silicates, or hydroxide/borates, or a mixture of these substances, in combination with mixtures composed of a phosphonite or of a phosphonite/phosphite mixture, and an ester or salt of montan wax acid, or a combination of these components with an aromatic di- or tricarboxylic ester or aromatic di- or tricarboxamide, or a combination of these are added. The specified oxides, hydroxides, carbonates, silicates, borates, stannates, mixed oxide/hydroxides, oxide/hydroxide/carbonates, hydroxide/silicates, or hydroxide/borates, or a mixture of these substances can suppress discoloration, but polymer degradation is observed. Surprisingly, it has been found that polymer degradation can also be inhibited by adding certain other additives.

The inventive combinations reduce discoloration of the plastics during processing in the melt, and suppress the degradation of the plastics to give units with lower molecular weight, together with full retention of flame retardancy.

M is preferably calcium, aluminum or zinc.

The protonated nitrogen bases are preferably the protonated bases of ammonia, melamine, triethanolamine, in particular $NH_4^+$.

$R^1$ and $R^2$, identical or different, are preferably $C_1$-$C_6$-alkyl, linear or branched, and/or phenyl.

$R^1$ and $R^2$, identical or different, are particularly preferably methyl, ethyl, n-propyl, isopropyl, n-butyl, tert-butyl, n-pentyl and/or phenyl.

$R^3$ is preferably methylene, ethylene, n-propylene, isopropylene, n-butylene, tert-butylene, n-pentylene, n-octylene, or n-dodecylene.

Another preferred meaning of $R^3$ is phenylene or naphthylene.

Suitable phosphinates have been described in PCT/WO 97/39053, expressly incorporated herein by way of reference.

Particularly preferred phosphinates are aluminum phosphinates, calcium phosphinates, and zinc phosphinates.

Synergistic combinations of the specified phosphinates with nitrogen-containing compounds which have more effective action as flame retardants than the phosphinates alone in very many polymers (DE-A-196 14 424, DE-A-197 34 437, and DE-A-197 37 727) are also in accordance with the invention. The flame-retardant action of the phosphinates may be improved via combination with other flame retardants, preferably nitrogen-containing synergists, or phosphorus/nitrogen flame retardants.

The nitrogen-containing synergists are preferably those of the formulae (III) to (VIII), or a mixture of these

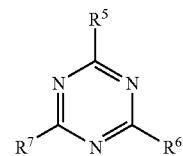

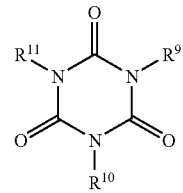

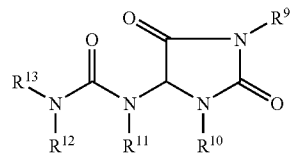

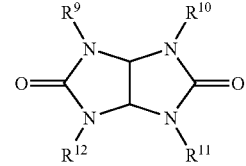

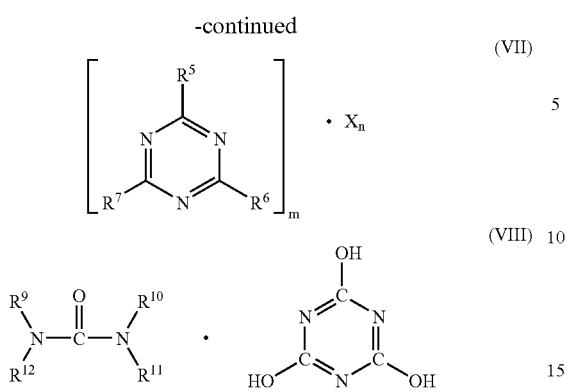

where
R$^5$ to R$^7$ are hydrogen, C$_1$-C$_8$-alkyl, C$_5$-C$_{16}$-cycloalkyl or -alkylcycloalkyl, optionally substituted with a hydroxy or a C$_1$-C$_4$-hydroxyalkyl function, C$_2$-C$_8$-alkenyl, C$_1$-C$_8$-alkoxy, -acyl, -acyloxy, C$_6$-C$_{12}$-aryl or -arylalkyl, —OR$^8$, or —N(R$^8$)R$^9$, or else a system of N-alicyclic or N-aromatic nature, R$^8$ is hydrogen, C$_1$-C$_8$-alkyl, C$_5$-C$_{16}$-cycloalkyl or -alkylcycloalkyl, optionally substituted with a hydroxy or a C$_1$-C$_4$-hydroxyalkyl function, C$_2$-C$_8$-alkenyl, C$_1$-C$_8$-alkoxy, -acyl, -acyloxy, or C$_6$-C$_{12}$-aryl or -arylalkyl, R$^9$ to R$^{13}$ are the same as the groups for R$^8$, or else —O—R$^8$, m and n independently of one another, are 1, 2, 3, or 4, X is acids which can form adducts with triazine compounds (III);

or comprise oligomeric esters of tris(hydroxyethyl) isocyanurate with aromatic polycarboxylic acids.

The nitrogen-containing synergists preferably comprise benzoguanamine, tris(hydroxyethyl) isocyanurate, allantoin, glycoluril, melamine, melamine cyanurate, dicyandiamide, guanidine, carbodiimides, zinc borate.

The nitrogen synergists preferably comprise condensation products of melamine. By way of example, condensation products of melamine are melem, melam, or melon, or compounds of this type with a higher condensation level, or else a mixture of the same, and, by way of example, may be prepared by the process described in PCT/WO 96/16948.

The phosphorus/nitrogen flame retardants preferably comprise reaction products of melamine with phosphoric acid or with condensed phosphoric acids, or comprise reaction products of condensation products of melamine with phosphoric acid or condensed phosphoric acids, or else comprise a mixture of the specified products.

The reaction products with phosphoric acid or with condensed phosphoric acids are compounds which arise via reaction of melamine or of the condensed melamine compounds, such as melam, melem, or melon etc., with phosphoric acid. By way of example, these are dimelamine phosphate, dimelamine pyrophosphate, melamine phosphate, melamine pyrophosphate, melamine polyphosphate, melam polyphosphate, melon polyphosphate, and melem polyphosphate, and mixed polysalts, e.g. those described in PCT/WO 98/39306.

The phosphorus/nitrogen flame retardant particularly preferably comprises melamine polyphosphate.

The phosphorus/nitrogen flame retardants preferably comprise nitrogen-containing phosphates of the formulae $(NH_4)_yH_{3-y}PO_4$ or $(NH_4PO_3)_z$, where y is from 1 to 3, and z is from 1 to 10 000.

The phosphorus/nitrogen flame retardants are preferably ammonium hydrogenphosphate, ammonium dihydrogenphosphate, or ammonium polyphosphate.

Additives may be added to the phosphinates alone or in combination with phosphorus/nitrogen flame retardants, examples of these additives being:

1. Antioxidants 1.1 Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2 Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3 Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, to (3,5-di-tert-butyl-4-hydroxyphenyl) adipate.

1.4 Tocopherols, for example α-tocopherol, β-tocopherol, γ-tocopherol, δ-tocopherol, and mixtures thereof (vitamin E).

1.5 Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3, 6-di-sec-amylphenol), 4,4'-bis(2,6-dimethyl-4-hydroxyphenyl) disulfide.

1.6 Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol to [3,3-bis(3'-tert-butyl-4'-hydroxyphenyl)butyrate], to (3-tert-butyl-4-hydroxy-5-methylphenyl)dicyclopentadiene, to [2-(3'-tert-butyl-2'-hydroxy-5'-methylbenzyl)-6-tert-butyl-4-methylphenyl] terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy- 2-methylphenyl)-4-n-dodecylmercaptobutane, 1,1,5,5-tetra(5-tert-butyl-4-hydroxy-2-methylphenyl)pentane.

1.7 O—, N— and S-benzyl compounds, for example 3,5,3',5'-tetra-tert-butyl-4,4'-dihydroxydibenzyl ether, octadecyl 4-hydroxy-3,5-dimethylbenzylmercaptoacetate, tris (3,5-di-tert-butyl-4-hydroxybenzyl)amine, to (4-tert-butyl-3-hydroxy-2,6-dimethylbenzyl) dithioterephthalate, to (3,5-di-tert-butyl-4-hydroxybenzyl) sulfide, isooctyl 3,5-di-tert-butyl-4-hydroxybenzylmercaptoacetate.

1.8 Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecyl mercaptoethyl-2,2-bis(3,5-di-tert-butyl-4-hydroxybenzyl)malonate, di-[4-(1,1,3,3-tetramethylbutyl)phenyl] 2,2-bis(3,5-di-tert-butyl-4-hydroxybenzyl)malonate.

1.9 Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10 Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

1.11 Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the Ca salt of the monoethyl ester of 3,5-di-tert-butyl-4-hydroxybenzylphosphonic acid.

1.12 Acylaminophenols, for example 4-hydroxylauranilide, 4-hydroxystearanilide, octyl N-(3,5-di-tert-butyl-4-hydroxyphenyl)carbamate.

1.13 Esters of β-(3,5-di-tert-butyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14 Esters of β-(5-tert-butyl-4-hydroxy-3-methylphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15 Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16 Esters of 3,5-di-tert-butyl-4-hydroxyphenylacetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17 Amides of β-(3,5-di-tert-butyl-4-hydroxyphenyl)propionic acid, e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

2. UV absorbers and Light Stabilizers 2.1 2-(2'-Hydroxyphenyl)benzotriazoles, for example 2-(2'-hydroxy-5'-methylphenyl)benzotriazole, 2-(3',5'-di-tert-butyl-2'-hydroxyphenyl)-benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl) benzotriazole, 2-(3',5'-di-tert-amyl-2'-hydroxyphenyl) benzotriazole, 2-(3',5'-bis(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonyl-ethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]benzotriazole with polyethylene glycol 300; [R—CH$_2$CH$_2$—COO (CH$_2$)$_3$]$_2$—, where R=3'-tert-butyl-4'-hydroxy-5'-2H-benzotriazol-2-ylphenyl.

2.2 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

2.3 Esters of substituted or unsubstituted benzoic acids, for example 4-tert-butyl-phenyl salicylate, phenyl salicylate, octylphenyl salicylate, dibenzoylresorcinol, to (4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4 Acrylates, for example ethyl α-cyano-β,β-diphenylacrylate or isooctyl α-cyano-β,β-diphenylacrylate, methyl α-carbomethoxycinnamate, methyl α-cyano-β-methyl-p-methoxycinnamate or butyl α-cyano-β-methyl-p-methoxycinnamate, methyl α-carbomethoxy-p-methoxycinnamate and N-(β-carbomethoxy-β-cyanovinyl)-2-methylindoline.

2.5 Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-tert-butylbenzylphosphonic acid, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.6 Sterically hindered amines, for example to (2,2,6,6-tetramethylpiperidyl) sebacate, to (2,2,6,6-tetramethylpiperidyl) succinate, to (1,2,2,6,6-pentamethylpiperidinyl) sebacate, to (1,2,2,6,6-pentamethylpiperidyl) n-butyl-3,5-di-tert-butyl-4-hydroxybenzylmalonate, the condensate of 1-hydroxyethyl-2,2,6,6-tetramethyl-4-hydroxypiperidine and succinic acid, the condensate of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, to (1,2,2,6,6-pentamethylpiperidyl) 2-n-butyl-2-(2-hydroxy-3,5-di-tert-butylbenzyl) malonate, 3-n-octyl-7,7,9,9-tetramethyl-1,3,8-triazaspiro[4.5] decane-2,4-dione, to (1-octyloxy-2,2,6,6-tetramethylpiperidyl) sebacate, to (1-octyloxy-2,2,6,6-tetramethylpiperidyl) succinate, the condensate of N,N'-bis(2,2,6,6-tetramethyl-4-piperidyl) hexamethylenediamine and 4-morpholino-2,6-dichloro-1,3,5-triazine, the condensate of 2-chloro-4,6-di-(4-n-butylamino-2,2,6,6-tetramethylpiperidyl)-1,3, 5-triazine and 1,2-bis(3-aminopropylamino)ethane, the condensate of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione.

2.7 Oxalamides, for example 4,4'-dioctyloxyoxanilide, 2,2'-diethoxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy-disubstituted and of o- and p-ethoxy-disubstituted oxanilides.

2.8 2-(2-Hydroxyphenyl)-1,3,5-triazines, such as 2,4,6-tris (2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine.

3. Metal deactivators, for example, N,N'-diphenyloxalamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, to (benzylidene)oxalyl dihydrazide, oxanilide, isophthaloyl dihydrazide, sebacoyl to phenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, to (2,4-di-tert-butylphenyl) pentaerythritol diphosphite, to (2,6-di-tert-butyl-4-methylphenyl) pentaerythritol diphosphite, to isodecyloxy pentaerythritol diphosphite, to (2,4-di-tert-butyl-6-methylphenyl) pentaerythritol diphosphite, to (2,4,6-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyldibenzo[d,g]-1,3,2-dioxaphosphocin, to (2,4-di-tert-butyl-6-methylphenyl) methyl phosphite, to (2,4-di-tert-butyl-6-methylphenyl) ethyl phosphite.

5. Peroxide degraders, e.g. esters of β-thiodipropionic acid, for example the lauryl, stearyl, myristyl, or tridecyl esters, mercaptobenzimidazole, the zinc salt of 2-mercaptobenzimidazole, zinc dibutyldithiocarbamate, dioctadecyl disulfide, pentaerythritol tetrakis(β-dodecylmercapto)propionate.

6. Polyamide stabilizers, e.g. copper salts in combination with iodides and/or phosphorus compounds; salts of divalent manganese.

7. Basic costabilizers, e.g. melamine, polyvinylpyrrolidone, dicyandiamide, triallyl cyanurate, urea derivatives, hydrazine derivatives, amines, polyamides, polyurethanes, the alkali metal and alkaline earth metal salts of higher fatty acids, examples being Ca stearate, Zn stearate, Mg behenate, Mg stearate, Na ricinoleate, K palmitate, antimony pyrocatecholate, or tin pyrocatecholate.

8. Nucleating agents, e.g. 4-tert-butylbenzoic acid, adipic acid, diphenylacetic acid.

9. Fillers and reinforcing agents, e.g. calcium carbonate, silicates, glass fibers, asbestos, talc, kaolin, mica, barium sulfate, metal oxides, and metal hydroxides, carbon black, graphite.

10. Other additives, e.g. plasticizers, expandable graphite, lubricants, emulsifiers, pigments, optical brighteners, flame retardants, antistatic agents, blowing agents.

These additional additives may be added to the polymers prior to, together with, or after addition of the flame retardants. These additives may be added here in the form of a solid, in solution, or as a melt, or else in the form of a solid or liquid mixture or masterbatch/concentrate, and the same applies to the flame retardants.

The metal oxides preferably comprise magnesium oxide, calcium oxide, aluminum oxide, zinc oxide, manganese oxide, and/or tin oxide.

The hydroxides preferably comprise aluminum hydroxide, boehmite, magnesium hydroxide, hydrotalcite, hydrocalumite, calcium hydroxide, zink hydroxide, tin oxide hydrate, and/or manganese hydroxide.

Component C preferably comprises zinc borate, basic zinc silicate, or zinc stannate.

Component C particularly preferably comprises magnesium hydroxide, zinc hydroxide, dihydrotalcite, or boehmite.

Phosphonites of the structure

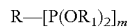 (I)

are suitable as component D, where

R is a mono- or polyvalent aliphatic, aromatic, or heteroaromatic organic radical, and $R_1$ is a compound of the structure (II)

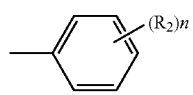 (II)

or the two radicals $R_1$ form a bridging group of the structure (III)

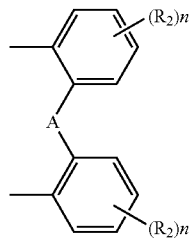 (III)

where

A is a direct bond, O, S, $C_{1-18}$-alkylene (linear or branched), $C_{1-18}$-alkylidene (linear or branched), where $R_2$, independently of one another, are $C_{1-12}$-alkyl (linear or branched), $C_{1-12}$-alkoxy, $C_{5-12}$-cycloalkyl, and n is from 0 to 5, and m is from 1 to 4.

The preferred radicals are

R $C_{4-18}$-alkyl (linear or branched), $C_{4-18}$-alkylene (linear or branched), $C_{5-12}$-cycloalkyl, $C_{5-12}$-cycloalkylene, $C_{6-24}$-aryl or -heteroaryl, $C_{6-24}$-arylene or -heteroarylene, which may also have further substitution;

$R_1$ a group of the structure (II) or (III), where $R_2$, independently of one another, are $C_{1-8}$-alkyl (linear or branched), $C_{1-8}$-alkoxy, cyclohexyl;

A is a direct bond, O, $C_{1-8}$-alkylene (linear or branched), $C_{1-8}$-alkylidene (linear or branched), and n is from 0 to 3, and m is from 1 to 3.

Particularly preferred radicals are

R cyclohexyl, phenyl, phenylene, biphenyl radicals $R_1$ a group of the structure (II) or (III), where $R_2$, independently of one another, are $C_{1-8}$-alkyl (linear or branched), $C_{1-8}$-alkoxy, cyclohexyl A is a direct bond, O, $C_{1-6}$-alkylidene (linear or branched), and n is from 1 to 3, and m is 1 or 2.

Mixtures of compounds in accordance with the preceding claims in combination with phosphites of the formula (IV) are also claimed, where $R_1$ is as defined above $P(OR_1)_3$ (IV).

Particular preference is given to compounds which, on the basis of the preceding claims, are prepared via a Friedel-Crafts reaction of an aromatic or heteroaromatic system, such as benzene, biphenyl, or diphenyl ether, with phosphorus trihalides, preferably phosphorus trichloride, in the presence of a Friedel-Crafts catalyst, such as aluminum chloride, zinc chloride, iron chloride, etc., and a subsequent reaction with the phenols underlying the structures (II) and (III). Mixtures with phosphites produced in the specified reaction sequence from excess phosphorus trihalide and from the phenols described above are expressly also covered by the invention.

Among this group of compounds, preference is in turn given to the structures (V) and (VI) below:

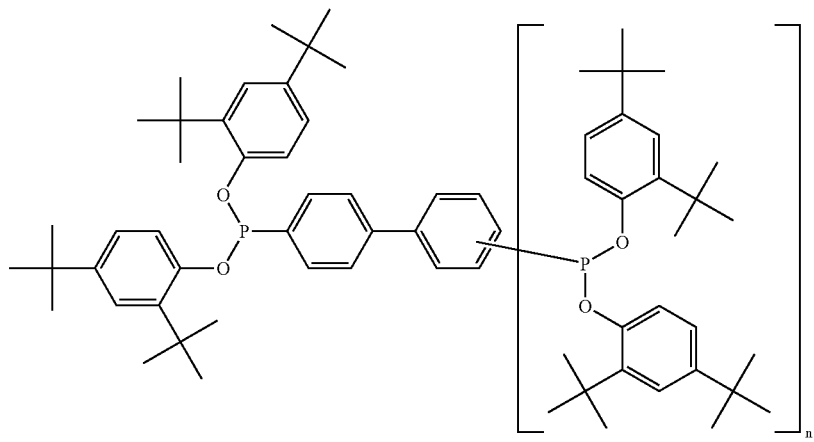 (V)

-continued

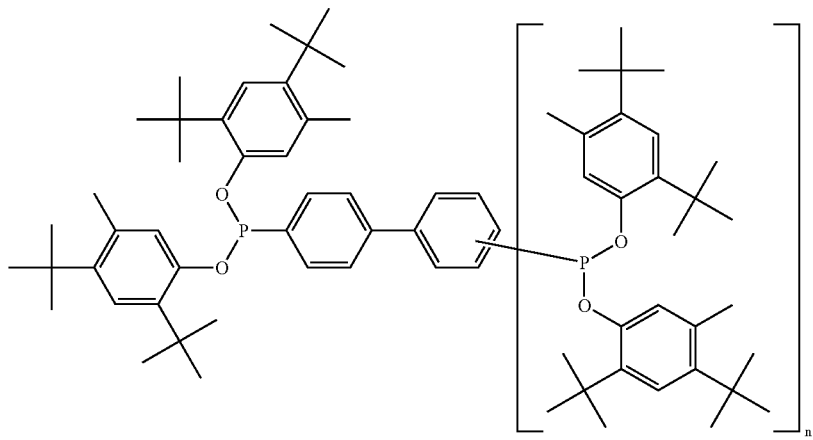

(VI)

where n may be 0 or 1, and where these mixtures may also optionally comprise proportions of the compound (VII) or (VIII):

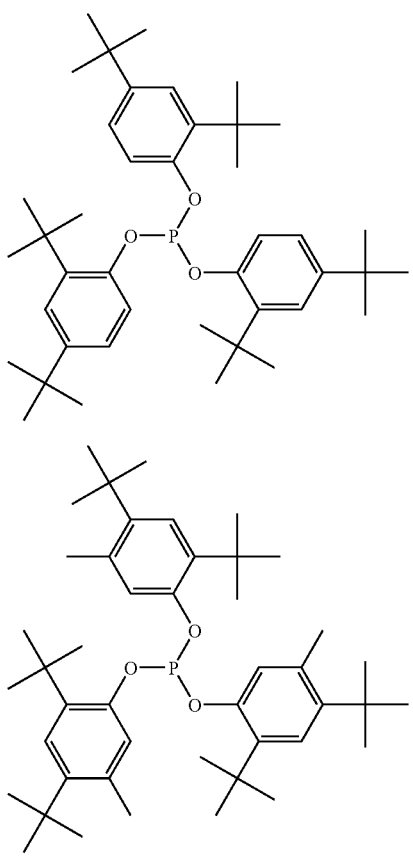

Esters or salts of long-chain aliphatic carboxylic acids (fatty acids), these typically having chain lengths of from $C_{14}$ to $C_{40}$, are suitable as component E. The esters comprise reaction products of the specified carboxylic acids with familiar polyhydric alcohols, e.g. ethylene glycol, glycerol, trimethylolpropane, or pentaerythritol. The alkali metal or alkaline earth metal salts, or aluminum salts and zinc salts of the specified carboxylic acids are in particular used.

Component E preferably comprises esters or salts of stearic acid, e.g. glycerol monostearate or calcium stearate.

Component E preferably comprises reaction products of montan wax acids with ethylene glycol.

The reaction products preferably comprise a mixture composed of the mono- and di(ethylene glycol) esters of montan wax acid, montan wax acids, and ethylene glycol.

Component E preferably comprises reaction products of montan wax acids with a calcium salt.

The reaction products particularly preferably comprise a mixture composed of the mono- and di(1,3-butanediol) esters of montan wax acid, montan wax acids, 1,3-butanediol, calcium montanate, and the calcium salt. Carboxylic (ester) amides are suitable as component F.

Component F preferably comprises a derivative of an aromatic di- or tricarboxylic (ester) amide.

The derivative preferably comprises N,N'-bispiperidinyl-1,3-benzenedicarboxamide.

The derivative particularly preferably comprises N,N'-bis (2,2,6,6-tetramethyl-4-piperdinyl)-1,3-benzenedicarboxamide.

The quantitative proportions of components A, B, and C in the flame retardant and stabilizer combined depend in essence on the intended application sector, and may vary within wide limits. Depending on the application sector, the flame retardant and stabilizer combined comprises from 25 to 99.9% by weight of component A, from 0 to 75% by weight of component B, and from 0.1 to 50% by weight of component C, from 0 to 5% by weight of component D, from 0 to 5% by weight of component E, and from 0.1 to 5% by weight of component F.

The flame retardant and stabilizer combined preferably comprises from 50 to 90% by weight of component A, from 0 to 50% by weight of component B, from 1 to 20% by weight of component C, from 0 to 5% by weight of component D, from 0 to 5% by weight of component E, and from 0.1 to 5% by weight of component F.

The flame retardant and stabilizer combined particularly preferably comprises from 50 to 80% by weight of component A, from 20 to 50% by weight of component B, and from 2 to 20% by weight of component C, from 0 to 3% by weight of component D, from 0 to 3% by weight of component E, and from 0.1 to 4% by weight of component F.

The inventive flame retardant and stabilizer combined may also comprise carbodiimides.

The invention also provides a flame-retardant plastics molding composition, comprising the inventive flame retardant and stabilizer combined. The plastic preferably comprises thermoplastic polymers of the type represented by HI (high-impact) polystyrene, polyphenylene ethers, polyamides, polyesters, polycarbonates, and blends or polyblends of the type represented by ABS (acrylonitrile-butadiene-styrene) or PC/ABS (polycarbonate/acrylonitrile-butadiene-styrene), or PPE/HIPS (polyphenylene ether/HI polystyrene) plastics.

The plastic particularly preferably comprises polyamides, polyesters, and PPE/HIPS blends.

The total amount preferably used of the flame retardant and stabilizer combined in the plastics molding composition is from 2 to 50% by weight, based on the plastics molding composition.

The total amount particularly preferably used of the flame retardant and stabilizer combined in the plastics molding composition is from 10 to 30% by weight, based on the plastics molding composition.

Finally, the invention also provides polymer moldings, polymer films, polymer filaments, and polymer fibers comprising the inventive flame retardant and stabilizer combined.

The polymer moldings, polymer films, polymer filaments, or polymer fibers are those wherein the polymer comprises HI (high-impact) polystyrene, polyphenylene ethers, polyamides, polyesters, polycarbonates, and blends or polyblends of the type represented by ABS (acrylonitrile-butadiene-styrene), or PC/ABS (polycarbonate/acrylonitrile-butadiene-styrene).

The polymer moldings, polymer films, polymer filaments, and polymer fibers preferably comprise, based on the polymer content, a total amount of from 2 to 50% by weight of the flame retardant and stabilizer combined.

The polymer moldings, polymer films, polymer filaments, and polymer fibers particularly preferably comprise, based on the polymer content, a total amount of from 10 to 30% by weight of the flame retardant and stabilizer combined.

In one particular embodiment, the polymer moldings, polymer films, polymer filaments, or polymer fibers comprise, based on the polymer content, from 2 to 30% by weight of the flame retardant and stabilizer combined, composed of from 50 to 80% by weight of component A, of from 20 to 50% by weight of component B, of from 2 to 20% by weight of component C, of from 0 to 3% by weight of component D, of from 0 to 3% by weight of component E, and of from 0.1 to 3% by weight of component F.

In one particular embodiment, the polymer moldings, polymer films, polymer filaments, or polymer fibers comprise, based on the polymer content, from 2 to 30% by weight of the flame retardant and stabilizer combined, composed of from 60 to 98% by weight of component A, of from 2 to 40% by weight of component C, of from 0 to 1% by weight of component D, of from 0 to 1% by weight of component E, and of from 0.1 to 1% by weight of component F.

The abovementioned additives may be introduced into the plastic in a very wide variety of operations. For example, in the case of polyamides or polyesters it is possible for the additives to be incorporated by mixing into the polymer melt at an early stage: at the start or at the end of the polymerization/polycondensation, or in a subsequent compounding process. There are also processes in which the additives are not added until later. This practice applies in particular when use is made of pigment masterbatches or additive masterbatches. Another possibility consists in applying additives, in particular those which are pulverulent, in a drum process, onto the polymer pellets, which may have retained heat from the drying process.

The flame retardant and stabilizer combined preferably takes the form of pellets, flakes, fine grains, powder, and/or micronized material.

The flame retardant and stabilizer combined preferably takes the form of a physical mixture of the solids, a melt mixture, a compacted material, an extruded material, or a masterbatch.

The mixture is preferably used in a molding composition of a polyamide or of a polyester. Examples of suitable polyamides are described in DE-A-199 20 276.

The polyamides preferably comprise those of amino-acid type and/or those of diamine/dicarboxylic-acid type.

The polyamides preferably comprise nylon-6 and/or nylon-6,6.

The polyamides are preferably unmodified, colored, filled, unfilled, reinforced, unreinforced, or else modified in any other way.

The polyesters preferably comprise polyethylene terephthalate or polybutylene terephthalate.

The polyesters are preferably unmodified, colored, filled, unfilled, reinforced, unreinforced, or else modified in any other way.

Carbodiimides may also be present.

EXAMPLES

1. Components Used
   Commercially available polymers (pellets):

| | |
|---|---|
| Nylon-6,6 (GRPA 6.6): | ® Durethan A 30 (Bayer AG, Germany) |
| ® Vetrotex 983 EC 10 4.5 mm glass fibers | (Saint-Gobain-Vetrotex, Germany) |

Flame retardant (component A):
Aluminum salt of diethylphosphinic acid, hereinafter termed DEPAL.

Synergist (Component B):
®Melapur 200 (melamine polyphosphate), hereinafter termed MPP, DSM Melapur, NL Component C:
Active zinc oxide, Bayer AG, Germany
®Firebrake ZB zinc borate, Borax, USA
®Magnifin H 10 magnesium hydroxide, Martinswerk, Germany
DHT 4A dihydrotalcite, Kyowa Chemicals, Japan Phosphonites (Component D):
Sandostab® P-EPQ®, Clariant GmbH, Germany Wax Components (Component E):
®Licomont CaV 102, Clariant GmbH, Germany
(Ca salt of montan wax acid)

Aromatic di- or Tricarboxylic Ester or Aromatic di- or Tricarboxamide (Component F):
Nylostab® S-EED®, Clariant GmbH, Germany
(* Nylostab S-EED is N,N'-bis(2,2,6,6-tetramethyl-4-piperidyl)-1,3-benzenedicarboxamide)

2. Preparation, Processing, and Testing of Flame-Retardant Plastics Molding Compositions The flame retardant components were mixed, in the ratio given in the table, with the phosphonite, the lubricants, and stabilizers, and incorporated via the lateral feed of a twin-screw extruder (Leistritz ZSE 27/44D) at temperatures of from 260 to 310° C., in nylon-6,6. The glass fibers were added via a second lateral feed. The homogenized polymer strand was drawn off, cooled in a waterbath, and then pelletized.

After adequate drying, the molding compositions were processed at melt temperatures of from 270 to 320° C. in an injection-molding machine (Arburg 320 C Allrounder) to give test specimens, and tested and classified for flame retardancy on the basis of the UL 94 (Underwriters Laboratories) test.

The flowability of the molding compositions was determined via determination of the melt volume index (MVR) at 275° C./2.16 kg. A sharp rise in the MVR value indicates polymer degradation.

Unless otherwise stated, all of the experiments of each series were carried out under identical conditions for comparability (temperature profiles, screw geometries, injection-molding parameters, etc.).

Mixing specifications comp 1 to comp 3 are comparative examples in which use was made of a flame retardant combination based on the aluminum salt of diethylphosphinic acid (DEPAL) and the nitrogen-containing synergist melamine polyphosphate (MPP), and the metal oxide and, respectively, borate alone.

The results where the flame retardant and stabilizer mixture of the invention was used are listed in Examples ex 1 to ex 3. All of the amounts are stated as % by weight and are based on the plastics molding composition including the flame retardant combination and additives.

TABLE 1

Results of experiments. comp 1-3 are comparative examples, and ex 1 to ex 3 represent an inventive flame retardant and stabilizer mixture

|  | comp 1 | comp 2 | comp 3 | ex 1 | ex 2 | ex 3 |
|---|---|---|---|---|---|---|
| Nylon-6,6 | 55 | 54 | 54 | 54 | 54 | 54 |
| Glass fibers | 30 | 30 | 30 | 30 | 30 | 30 |
| A: DEPAL | 10 | 10 | 10 | 10 | 10 | 10 |
| B: MPP | 5 | 5 | 5 | 5 | 5 | 5 |
| C: Zinc oxide |  | 1 |  |  |  |  |
| C: Zinc borate |  |  | 1 | 0.5 | 0.5 | 0.5 |
| D: CaV 102 |  |  |  | 0.5 |  |  |
| E: P-EPQ |  |  |  |  | 0.5 |  |
| F: S-EED |  |  |  |  |  | 0.5 |
| UL 94, 1.6 mm | V-0 | V-0 | V-0 | V-0 | V-0 | V-0 |
| MVR 275° C./2.16 kg | 5 | 12 | 10 | 6 | 6 | 5 |
| Tensile strain at break [%] | 5.3 | 3.6 | 4.2 | 4.8 | 5.0 | 5.3 |
| Color | grey | white | white | white | white | white |
| Impact strength [kJ/m²] | 68 | 37 | 54 | 61 | 63 | 66 |
| Notched impact strength [kJ/m²] | 10.8 | 7.1 | 9.2 | 9.4 | 9.7 | 11 |

From the examples it is apparent that the inventive additives (mixture composed of the components phosphinate, nitrogen synergist, and oxide and, respectively, borate, and also component D, E, or F) markedly improve the processability of the polymers and the properties of the injection moldings, with no impairment of flame-retardant action.

Incorporation of the flame retardants DEPAL and MPP in nylon-6,6 leads to gray discoloration of the molding compositions (ex 1). Addition of zinc oxide or zinc borate can inhibit the gray discoloration, but there is a marked deterioration in mechanical properties (comp 2, comp 3).

If use is now made of an inventive flame retardant and stabilizer combined composed of phosphinate, nitrogen synergist, borate, and calcium salt of montan wax acid (comp 1), the results are not only flame retardancy, but also no discoloration, and good mechanical properties. From the low MVR value it can be seen that no polymer degradation occurs. When phosphonite (ex 2) and Nylostab S-EED are used, flame retardancy, lack of discoloration, and good mechanical properties are likewise seen. Surprisingly, the use of Nylostab S-EED gives high impact strength and notched impact strength.

What is claimed is:

1. A flame retardant and stabilizer combined, for thermoplastic polymers, comprising from 50 to 90% by weight of a component A selected from the group consisting of a phosphinic salt of the formula (I), a diphosphinic salt of the formula (II), polymers of the formula (I), polymers of the formula (II) and mixtures thereof,

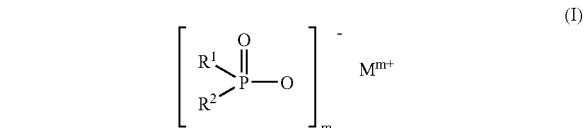

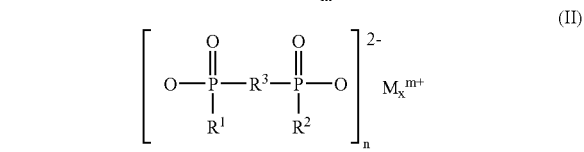

where $R^1$, $R^2$ are identical or different and are $C_1$-$C_6$-alkyl, linear or branched, or aryl;

$R^3$ is $C_1$-$C_{10}$-alkylene, linear or branched, $C_6$-$C_{10}$-arylene, -alkylarylene or -arylalkylene;

M is Mg, Ca, Al, Sb, Sn, Ge, Ti, Zn, Fe, Zr, Ce, Bi, Sr, Mn, Li, Na, K, or a protonated nitrogen base;

m is 1 to 4;

n is 1 to 4;

x is 1 to 4, as component B, from 10 to 75% by weight of a nitrogen-containing synergist or of a phosphorus/nitrogen flame retardant, as component C, from 0.1 to 50% by weight of a basic or amphoteric oxide, hydroxide, carbonate, silicate, borate, stannate, mixed oxide/hydroxide, oxide/hydroxide/carbonate, hydroxide/silicate, hydroxide/borate, or a mixture thereof, as component D, from 0 to 5% by weight of a phosphonite of the structure

where

R is a mono- or polyvalent aliphatic, aromatic, or heteroaromatic organic radical, and R₁ is a compound of the structure (II)

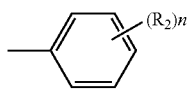
(II)

or the two radicals R₁ form a bridging group of the structure (III)

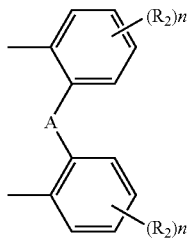
(III)

where
A is a direct bond, O, S, $C_{1-18}$-alkylene (linear or branched), or $C_{1-18}$-alkylidene (linear or branched), where
$R_2$ independently of one another, are $C_{1-12}$-alkyl (linear or branched), $C_{1-12}$-alkoxy, or $C_{5-12}$-cycloalkyl, and
n is from 0 to 5, and
m is from 1 to 4,
as component E, from 0 to 5% by weight of an ester or salt of montan wax acid, and comprises, as component F, from 0.1 to 5% by weight of an N,N'-bispiperidinyl-1,3-benzene-dicarboxamide and/or N,N'-bis(2,2,6,6-tetramethyl-4-piperidinyl)-1,3-benzenedicarboxamide, the entirety of the components always being 100% by weight.

2. The flame retardant and stabilizer combined, as claimed in claim 1, wherein $R^1$ and $R^2$ are identical or different, and are $C_1$-$C_6$-alkyl, linear or branched, or phenyl.

3. The flame retardant and stabilizer combined, as claimed in claim 1, wherein $R^1$ and $R^2$ are identical or different and are methyl, ethyl, n-propyl, isopropyl, n-butyl, tert-butyl, n-pentyl or phenyl.

4. The flame retardant and stabilizer combined, as claimed in claim 1, wherein $R^3$ is methylene, ethylene, n-propylene, isopropylene, n-butylene, tert-butylene, n-pentylene, n-octylene, n-dodecylene; phenylene, naphthylene; methylphenylene, ethylphenylene, tert-butylphenylene, methylnaphthylene, ethylnaphthylene, tert-butylnaphthylene; phenylmethylene, phenylethylene, phenylpropylene, or phenylbutylene.

5. The flame retardant and stabilizer combined, as claimed in claim 1, wherein M is calcium ions, aluminum ions, or zinc ions.

6. The flame retardant and stabilizer combined, as claimed in claim 1, wherein component B is a condensation product of melamine.

7. The flame retardant and stabilizer combined, as claimed in claim 6, wherein the condensation product of melamine is melem, melam, melon or compounds thereof having higher condensation levels.

8. The flame retardant and stabilizer combined, as claimed in claim 1, wherein component B is reaction products of melamine with polyphosphoric acid, reaction products of condensation products of melamine with polyphosphoric acid, or mixtures thereof.

9. The flame retardant and stabilizer combined, as claimed in claim 8, wherein the reaction products comprise dimelamine pyrophosphate, melamine polyphosphate, melem polyphosphate, melam polyphosphate, melon polyphosphate or mixed polysalts thereof.

10. The flame retardant and stabilizer combined, as claimed in claim 9, wherein component B is melamine polyphosphate.

11. The flame retardant and stabilizer combined, as claimed in claim 1, wherein the phosphorus/nitrogen flame retardant is a nitrogen-containing phosphate of the formula $(NH_4)_y H_{3-y} PO_4$ or $(NH_4 PO_3)_z$, where y is from 1 to 3, and z is from 1 to 10,000.

12. The flame retardant and stabilizer combined, as claimed in claim 11, wherein the phosphorus/nitrogen flame retardant is ammonium hydrogenphosphate, ammonium dihydrogenphosphate, or ammonium polyphosphate.

13. The flame retardant and stabilizer combined, as claimed in claim 1, wherein the nitrogen-containing synergist is of the formulae (III) to (VIII), or a mixture thereof

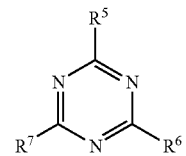
(III)

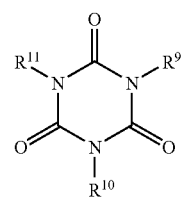
(IV)

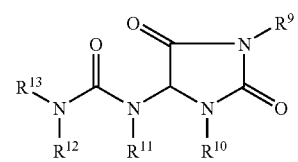
(V)

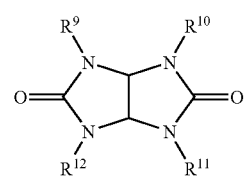
(VI)

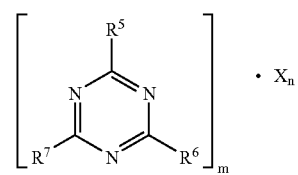
(VII)

-continued

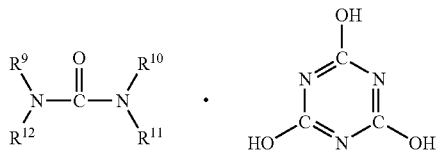

where
R$^5$ to R$^7$ are hydrogen, C$_1$-C$_8$-alkyl, C$_5$-C$_{16}$-cycloalkyl or -alkylcycloalkyl, optionally substituted with a hydroxy or a C$_1$-C$_4$-hydroxyalkyl function, C$_2$-C$_8$-alkenyl, C$_1$-C$_8$-alkoxy, -acyl, -acyloxy, C$_6$-C$_{12}$-aryl or -arylalkyl, —OR$^8$, or —N(R$^8$)R$^9$, or a N-alicyclic or N-aromatic system, R$^8$ is hydrogen, C$_1$-C$_8$-alkyl, C$_5$-C$_{16}$-cycloalkyl or -alkylcycloalkyl, optionally substituted with a hydroxy or a C$_1$-C$_4$-hydroxyalkyl function, C$_2$-C$_8$-alkenyl, C$_1$-C$_8$-alkoxy, -acyl, -acyloxy, or C$_6$-C$_{12}$-aryl or -arylalkyl, R$^9$ to R$^{13}$ are the same as the groups for R$^8$, or —O—R$^8$, m and n independently of one another, are 1, 2, 3, or 4, X is an acid which forms adducts with triazine compounds (III); or an oligomeric ester of tris(hydroxyethyl) isocyanurate with aromatic polycarboxylic acids.

14. The flame retardant and stabilizer combined, as claimed in claim 1, wherein the nitrogen-containing synergist is benzoguanamine, tris(hydroxyethyl) isocyanurate, allantoin, glycoluril, melamine, melamine cyanurate, dicyandiamide or guanidine.

15. The flame retardant and stabilizer combined, as claimed in claim 1, further comprising a carbodiimide.

16. The flame retardant and stabilizer combined, as claimed in claim 1, wherein component C is magnesium oxide, calcium oxide, aluminum oxide, zinc oxide, manganese oxide, or tin oxide.

17. The flame retardant and stabilizer combined, as claimed in claim 1, wherein component C is aluminum hydroxide, boehmite, dihydrotalcite, hydrocalumite, magnesium hydroxide, calcium hydroxide, zinc hydroxide, tin oxide hydrate, manganese hydroxide, zinc borate, basic zinc silicate or zinc stannate.

18. The flame retardant and stabilizer combined, as claimed in claim 1, comprising from 10 to 50% by weight of component B, from 1 to 20% by weight of component C, from 0 to 5% by weight of component D, from 0 to 5% by weight of component E, and from 0.1 to 5% by weight of component F.

19. The flame retardant and stabilizer combined, as claimed in claim 1, comprising from 50 to 80% by weight of component A, from 20 to 50% by weight of component B, from 2 to 20% by weight of component C, from 0 to 3% by weight of component D, from 0 to 3% by weight of component E, and from 0.1 to 4% by weight of component F.

20. A flame-retardant plastic molding composition, comprising a flame retardant and stabilizer combined, as claimed in claim 1.

21. The flame-retardant plastic molding composition as claimed in claim 20, wherein the plastic is a thermoplastic polymer selected from the group consisting of HI (high-impact) polystyrene, polyphenylene ethers, polyamides, polyesters, polycarbonates, or blends or polyblends of ABS (acrylonitrile-butadiene-styrene), PC/ABS (polycarbonate/acrylonitrile-butadiene-styrene), or PPE/HIPS (polyphenylene ether/HI polystyrene) plastic.

22. The flame-retardant plastic molding composition as claimed in claim 20, wherein the plastic is polyamide.

23. The flame-retardant plastic molding composition as claimed in claim 20, comprising from 2 to 50% by weight of the flame retardant and stabilizer combined, based on the plastic molding composition.

24. The flame-retardant plastic molding composition as claimed in claim 20, comprising from 10 to 30% by weight of the flame retardant and stabilizer combined, based on the plastic molding composition.

25. The flame-retardant plastic molding composition as claimed in claim 20, wherein the flame retardant and stabilizer combined further comprises a carboiimide.

26. A polymer composition comprising a flame retardant and stabilizer combined, as claimed in claim 1, wherein the polymer compound is selected from the group consisting of a polymer molding, polymer film, polymer filament and polymer fiber.

27. The polymer composition as claimed in claim 26, wherein the polymer is selected from the group consisting of HI (high-impact) polystyrene, polyphenylene ethers, polyamides, polyesters, polycarbonates, and blends or polyblends of ABS (acrylonitrile-butadiene-styrene), or PC/ABS (polycarbonate/acrylonitrile-butadiene-styrene).

28. The composition as claimed in claim 26 comprising from 2 to 50% by weight of the flame retardant and stabilizer combined, based on the polymer content.

29. The polymer composition as claimed in claim 26, comprising from 10 to 30% by weight of the flame retardant and stabilizer combined, based on the polymer content.

30. The polymer composition as claimed in claim 26, wherein the flame retardant and stabilizer combined further comprises a carbodiimide.

* * * * *